May 19, 1931.  A. B. CADMAN  1,806,191
TRAILER VEHICLE
Filed July 14, 1927   4 Sheets-Sheet 1
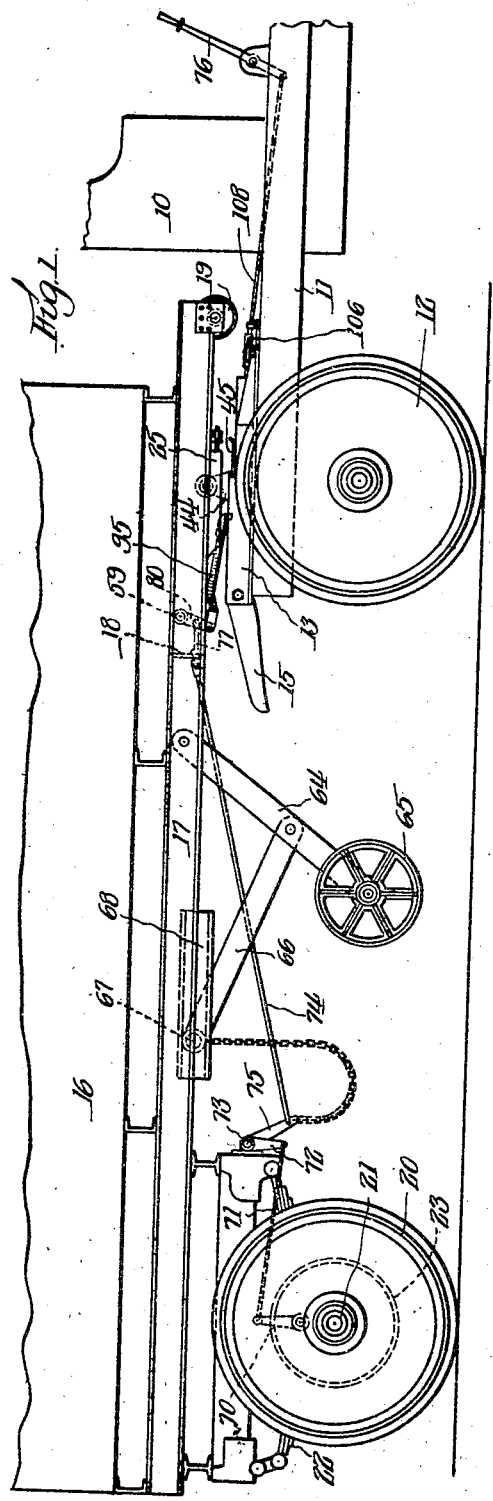
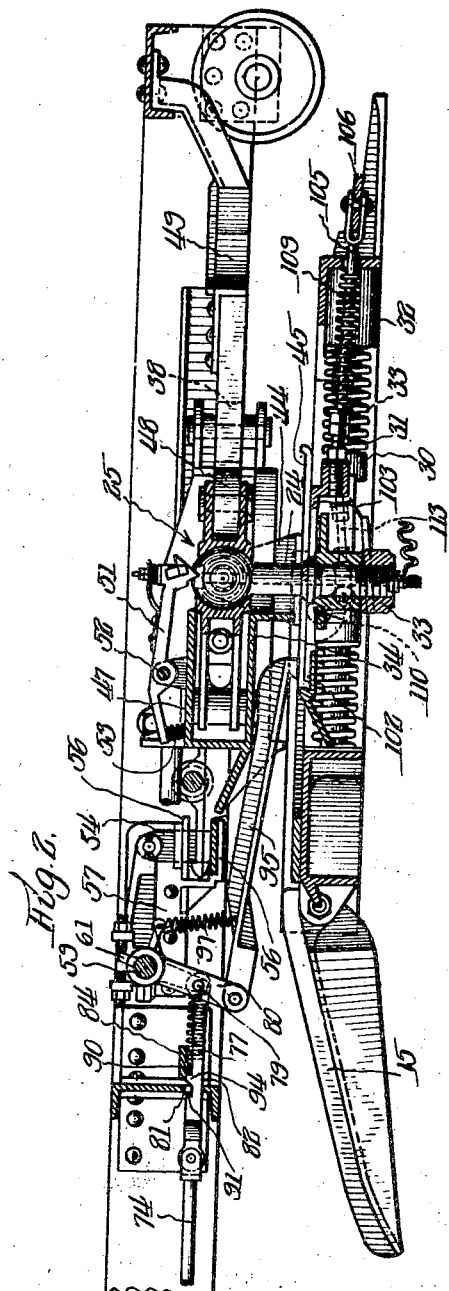
Inventor
Addi B. Cadman,
By Churchill Parker Carlson
Attys.

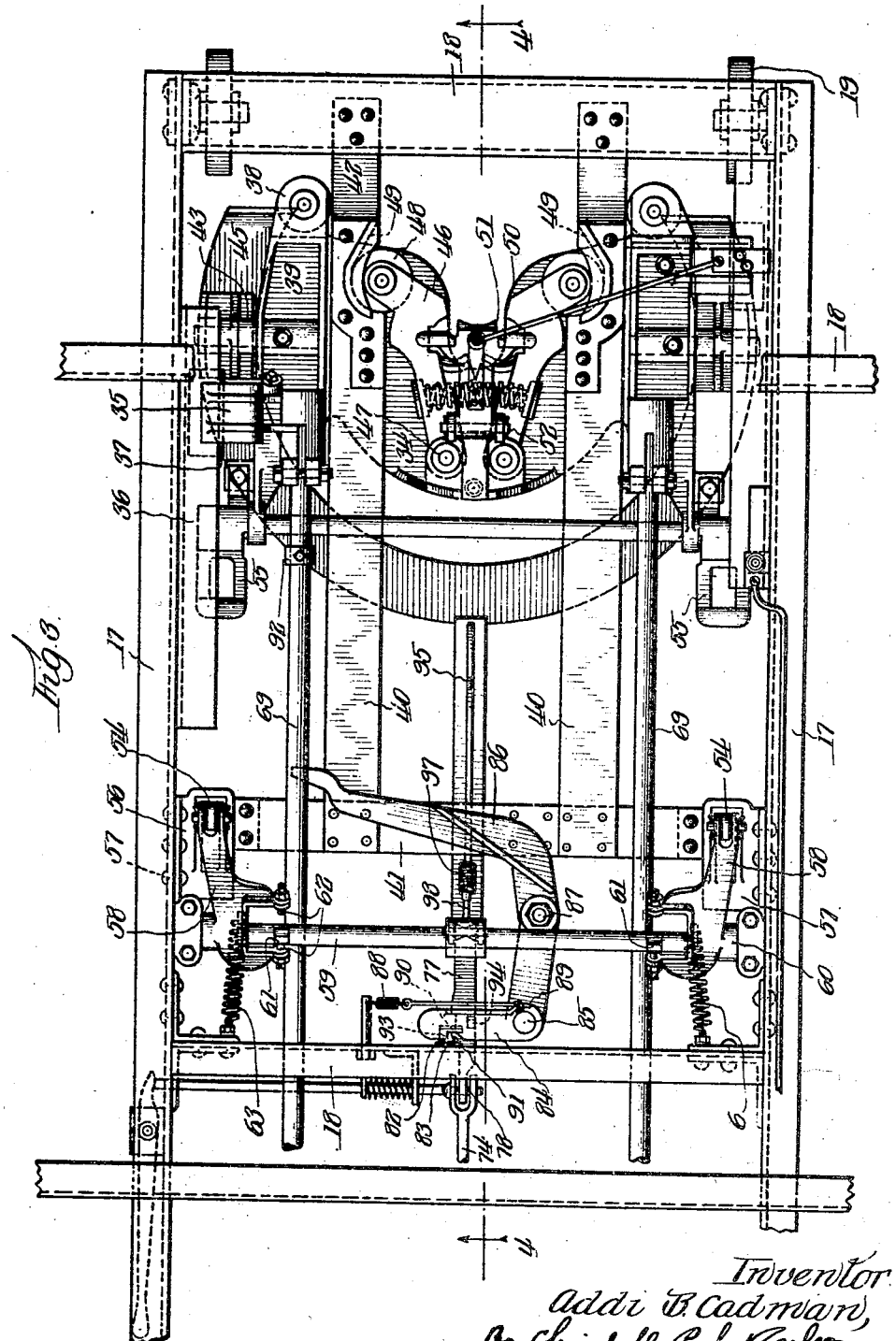

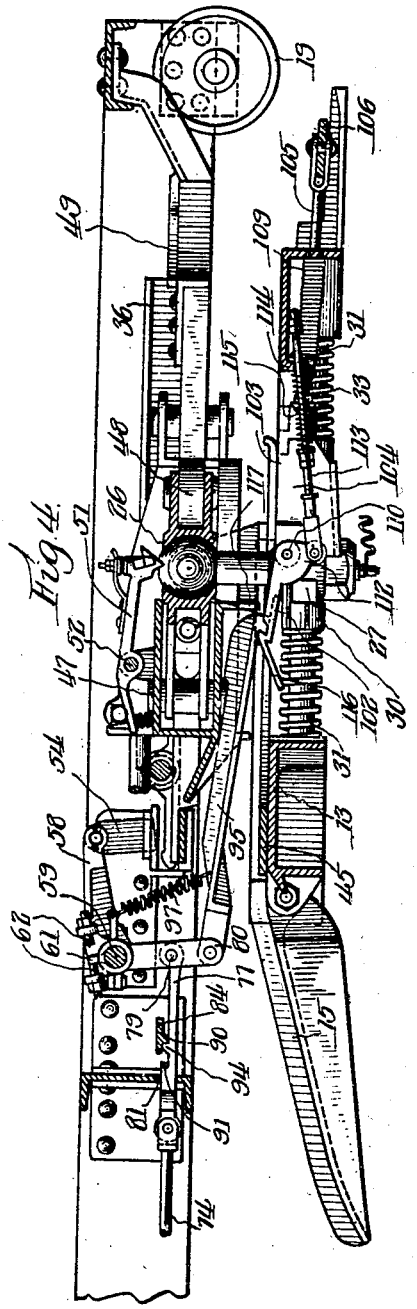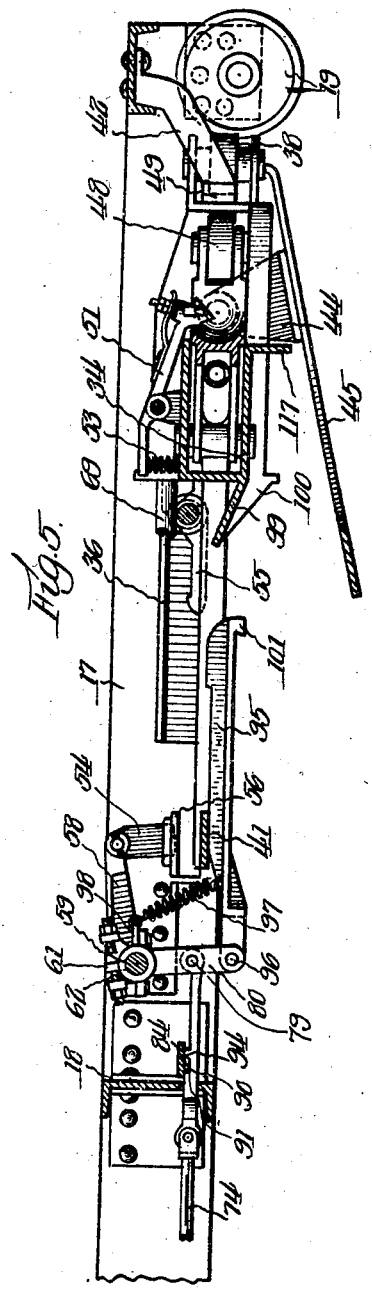

May 19, 1931. A. B. CADMAN 1,806,191
TRAILER VEHICLE
Filed July 14, 1927 4 Sheets-Sheet 4
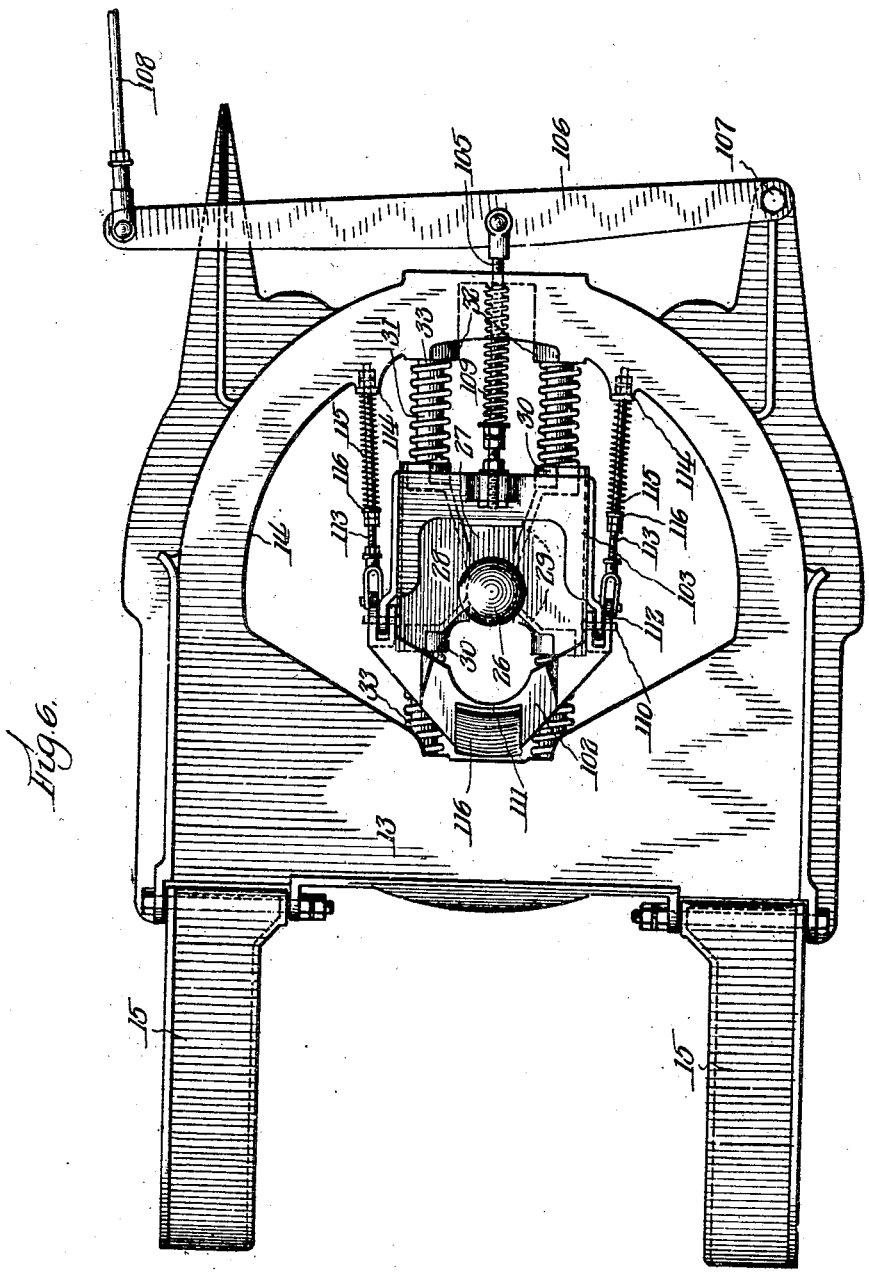
Inventor
Addi B. Cadman,
By Churchill Parke Karlson
Attys Patented May 19, 1931

1,806,191

UNITED STATES PATENT OFFICE

ADDI BENJAMIN CADMAN, OF BELOIT, WISCONSIN, ASSIGNOR TO WARNER MFG. CO., OF SOUTH BELOIT, ILLINOIS, A CORPORATION OF MICHIGAN

TRAILER VEHICLE

Application filed July 14, 1927. Serial No. 205,607.

My invention relates to improvements in trailer vehicles and more particularly to a combined vehicle comprising a tractor section and a so-called automatic detachable semi-trailer.

In my prior applications Serial No. 92,428, filed March 5, 1926, and Serial No. 190,491, filed May 11, 1927, I have disclosed a semi-trailer in which the trailer brake, the lock for the coupling mechanism and the leg for supporting the forward end of the semi-trailer are operated automatically during each complete uncoupling and coupling cycle by relative movement between the tractor and trailer following the actuation of a manually operable control device prior to the uncoupling operation. The control device shown in said applications is located on the trailer because in a majority of cases it has been found inconvenient to locate one or more additional hand levers in the tractor cab. Furthermore, the convenience to the driver of the tractor by locating the control levers within his reach is offset by the complexity of the mechanism heretofore required to control the semi-trailer solely from the cab of the tractor. In certain instances, however, where detachment of the tractor is effected frequently, it is desirable to operate the brake and coupling mechanisms from the tractor cab. My co-pending application Serial No. 661,376, filed September 7, 1923, shows and claims a tractor-trailer of this general type.

The primary object of the present invention therefore is to provide an automatic detachable semi-trailer and tractor combination wherein the control of each uncoupling and coupling cycle of operation is effected manually by the single actuation prior to uncoupling of a device located on the tractor.

A more detailed object is to provide an improved tractor-trailer of the semi-trailer type wherein the trailer brake and coupling lock are conditioned to permit forward movement of the tractor in uncoupling from the trailer by the actuation of a hand controlled device on the tractor, said device also serving to condition a mechanism so that the trailer brakes will be automatically released and the coupling mechanism automatically locked during the subsequent operation of coupling the tractor to the trailer.

Another object is to provide a novel means by which the trailer brake can be set by hand from the tractor, releasably held in set position to permit uncoupling regardless of the position of the tractor control means, and finally released automatically at the completion of the subsequent coupling operation.

Still another object is to provide a tractor semi-trailer combination having an improved means by which a lock for the coupling mechanism located on the trailer may be released by hand from the tractor, releasably held in unlocking position independently of the hand actuating means whereby to permit uncoupling, and automatically moved into locking position at the completion of the subsequent coupling operation.

Other objects and advantages of the invention will become apparent from the following detailed description taken in connection with the accompanying drawings in which Figure 1 is a fragmentary side elevation of a tractor-trailer vehicle embodying the features of the present invention.

Fig. 2 is a fragmentary view in vertical central section of the forward end of the trailer and the rear end of the tractor.

Fig. 3 is a plan view of the forward end of the trailer when uncoupled from the tractor.

Fig. 4 is a sectional view taken along the line 4—4 of Fig. 3 showing a portion of the tractor coupled to the trailer.

Fig. 5 is a sectional view also taken along the line 4—4 of Fig. 3 but showing the trailer detached.

Fig. 6 is a plan view of the rear end of the tractor.

While the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

Generally stated the invention comprises a tractor and a semi-trailer combination of the type disclosed in my copending application Serial No. 190,491, filed May 11, 1927, with the addition of means operable by hand from the cab of the tractor by which the trailer brake may be set and the coupling mechanism may be unlocked so as to condition the trailer from uncoupling and also for automatic operation in the succeeding coupling movement of the tractor.

The tractor section of the vehicle shown herein is of the motor driven type adapted to be controlled from a cab 10. It has a frame 11 supported in the usual way by rear wheels 12, the frame having on its rear end a stationary member of a fifth wheel structure. This member (see Figs. 2 and 6) is in the form of a casting 13 resting upon and rigidly secured to the rear end of the tractor frame 11 and having a flat upper surface with an opening 14 therein. Inclined trackways 15 are provided at the rear end of the fifth-wheel member for raising and lowering the forward end of the trailer while the tractor is being coupled to and uncoupled from the trailer.

The body 16 of the semi-trailer may be built upon a chassis having a horizontal frame structure which is adapted to overlie the rear end of the tractor when the vehicles are coupled together, as shown in Fig. 1. This frame structure may be composed of longitudinally extending channel bars 17 secured together by suitable cross pieces 18 with the inner frame bars preferably projecting forwardly from the body of the trailer and equipped with wheels 19 which are adapted to roll up and down the inclined trackways on the tractor. At its rear end, the trailer frame is supported in the usual way by wheels 20 on a non-rotatable axle 21 carrying springs 22. Each wheel is equipped with a brake drum 23 having internal shoes which may be expanded into gripping engagement with the internal surface of the drum by the usual cams (not shown), there being two of such cams in the present instance.

The coupling mechanism by which the tractor and the semi-trailer are adapted to be connected for combined operation and disconnected to permit independent operation, comprises generally a king pin 24 on the tractor, a slidable element 25 hereinafter called the coupling carriage mounted in the forward portion of the trailer frame and arranged to be connected to the king pin so as to be moved positively thereby during coupling and uncoupling, and means for locking said carriage against movement in the trailer so that the pull of the tractor is applied to the trailer through the medium of the carriage. In the present instance, the king pin projects upwardly through the opening 14 in the fifth-wheel member 13 and is formed at its upper end with a ball-shaped portion 26. The mounting for the king pin comprises a casting 27 (see Figs. 2 and 6) having a flat upper surface 28 beneath which are outwardly diverging ribs 29 terminating in bearing portions 30 on slide rods 31. The rods may be rigidly supported at their opposite ends by bearings 32 formed on the under side of the member 13. Springs 33 on the rods 31 acting between the bearings 30 and 32 serve to permit yielding fore and aft movement of the casting 27. The lower end of the king pin extends through a central bore in the casting 27 and is securely held therein by a clamping nut 33 threaded on the king pin.

In the form illustrated herein, the carriage 25 is a unitary casting consisting of a substantially flat plate 34 having an upstanding portion at either side thereof which terminates in a horizontal wing 35 overlying and resting upon the horizontal flange 36 of an angle bar secured to the adjacent frame bar 17. The wing 35 on the right hand side is disposed near the front of the carriage while the other wing is disposed near the rear of the carriage, the two wings thus providing a firm and slidable suspension means for the carriage.

Projecting laterally from the upstanding portions beneath the wings 35 are trunnions (not shown) providing bearings for wheels 37 which roll along the under side of the flanges 36 and thereby sustain the weight of the trailer upon the carriage when the latter is coupled to and resting upon the tractor. To guide the carriage against lateral movement in the trailer frame, rollers 38 are mounted on vertical pins in bifurcated extensions 39 of the carriage plate 34 and are adapted to bear against the outer side surfaces of two parallel bars 40 as the carriage slides back and forth in the frame. The bars 40 are supported at their rear ends by a cross-plate 41 and at their forward ends by brackets 42 rigidly secured to the front cross-piece 18 of the trailer frame.

Pivotally mounted on two axially alined and horizontal trunnions 43 on opposite sides of the carriage are the upstanding standards 44 (see Fig. 2) of a movable fifth wheel plate 45 which rests upon the tractor plate 13 when the trailer and tractor are coupled together and thereby sustains the weight of the forward end of the trailer at the same time providing for vertical swiveling between the tractor and trailer frames. Preferably, the forward portion of the plate 45 is cut away so as to pass the king pin 24 when the tractor and trailer are being united.

The king pin is adapted to be connected to the coupling carriage as the tractor moves rearwardly in coupling to the trailer and to be automatically freed from the carriage at the end of the forward stroke of the carriage during uncoupling. This is accomplished by two horizontally swingable jaws 46 (Fig. 3) which cooperate to provide a forwardly opening socket for the ball-shaped portion of the king pin. The jaws have complemental concave surfaces intermediate their ends and are pivoted at their rear ends on pins 47 on the carriage. At their forward ends, the jaws are bifurcated and are equipped with rollers 48 which are received in opposed recesses 49 in the brackets 42 when the carriage is in its foremost or uncoupled position (Fig. 3). The forward portions of the concave jaw surfaces are cut short so as to allow the king pin to enter the socket when the jaws are spread apart. Thus, as the tractor backs under the trailer in coupling, the king pin enters the socket and strikes the rear portions of the concave surfaces. This forces the carriage rearwardly, the rollers 48 being thereby cammed inwardly to close the jaws about the king pin. In the continued movement of the carriage rearwardly, the inner side edges of the bars 40 act as cams on the rollers 48 to hold the jaws locked about the king pin. Thus, at the beginning of the coupling operation, the tractor will be locked to the carriage and near the end of the uncoupling operation when the carriage has been pulled forwardly by the tractor, as will be described later, the rollers 48 will be positioned opposite the recesses 49, and the jaws will be allowed to spread apart.

To guide the king pin 24 into the coupling socket and thereby to facilitate coupling of the tractor and trailer, the carriage plate 34 is formed at its forward end with a rearwardly tapering throat 50 (Fig. 3) which terminates beneath the socket provided by the coupling jaws.

To lock the socket open and the carriage in its foremost or uncoupled position, a tongue 51 is pivoted at 52 on the carriage, its forward end being pressed downwardly by a spring 53. The upper end of the king pin engages and disengages the forward end of the tongue during coupling and uncoupling so as to move the tongue into and out of the space between the jaws 46.

As a means for locking the carriage in its rearmost or coupled position on the trailer, two locking pins 54 are mounted on the trailer for vertical movement into engagement with horizontal tail pieces 55 which project rearwardly from the carriage. The tail pieces having apertures therein are each positioned at such a level as to enter the recess formed by two horizontal ribs 56 (Fig. 2) on a bracket 57 when the carriage approaches its rearward limit of travel. The brackets are secured as by riveting to the inner sides of the inner frame channels 17. The upper rib of each bracket has an aperture therein which coincides with the aperture in the corresponding tail piece 55 when the carriage is in its rearmost position, the side edges of this aperture serving to guide the locking pin in its movement. Herein the lower ribs serve to support the cross piece 41.

In the present instance, each locking pin 54 is pivotally connected at its upper end to the free bifurcated end of a crank arm 58 which is loosely mounted on a rock shaft 59 journaled at its opposite ends in bearings 60 on the bracket members 57. The locking pins, being pivotally suspended from the arms 58, may be raised and lowered by oscillation of the arms. Thus, it will be observed that when the locking pins are in raised position, as shown in Fig. 4, the tail pieces 55 are free to enter or leave the space between the ribs 56. When the pins are projected downwardly through the alined apertures in the ribs 56 and the tail pieces, as shown in Fig. 2, the carriage will be locked in its rearmost position, this downward movement of the locking pins being limited by the plate 41. With the carriage thus locked in the trailer frame, the tractive force applied to the carriage by the tractor king pin will be applied directly to the locking pins which will be drawn against the forward edges of the apertures in the upper rib 56 thereby transmitting the pull of the tractor to the bracket members 57 and the trailer frame.

As a means for raising and lowering the locking pins 54 by oscillation of the control shaft, a lost motion connection is provided between the shaft and the crank arms 58. This connection comprises lugs 61 rigid with the shaft 59 and positioned to coact with the ends of two adjusting screws 62 threaded into laterally extending arms on the crank arms 58. The arrangement is such that when the shaft 59 is oscillated to carry the lugs 61 rearwardly, the rear screws 62 will be engaged to swing the crank arms 58 upwardly thereby raising the locking pins into unlocking position (see Fig. 4). When the shaft 59 is released for reverse oscillation, springs 63 acting on extensions on the cranks 58 serve to swing the cranks downwardly, thereby projecting the locking pins through the tail pieces.

The means for supporting the forward end of the trailer when detached from the tractor comprises a frame 64 (Fig. 1) pivoted on the trailer frame and equipped at its lower end with land-engaging wheels 65. This frame is raised and lowered in the back and forth movement of the carriage through the medium of bars 66 connecting the medial portion of the frame 64 to a cross shaft 67. This shaft is shifted back and forth along guideways 68 by rigid rods 69 connecting the opposite ends of the shaft to opposite sides of the carriage 25.

Two independently operable means are provided in the present instance for setting the brakes, one being intended for use in maintaining the position of the trailer during coupling and uncoupling, the other being intended for use in applying the brakes while the trailer is being drawn about by the tractor. The latter means is operated by electromagnetic action and controlled from the tractor cab as is more fully pointed out in my application last referred to.

The operating means for setting the trailer brakes to permit coupling and uncoupling includes a crank 70 (Fig. 1) on one cam shaft of each trailer brake, this crank being connected by rods 71 and a crank 72 to a rock shaft 73. The latter may be rocked to set and release each of the brakes by the actuation of a common brake rod 74 disposed centrally of the trailer frame and connected to the end of a crank 75 on the shaft 73. The arrangement is such that the brakes will be set when the rod 74 is pulled forwardly.

The mechanism by which the brakes and coupling locking pins are conditioned for uncoupling of the tractor and trailer is intended to be actuated by the driver of the tractor prior to detachment of the tractor. In general, this control mechanism includes a hand lever 76 (Fig. 1) located in the tractor cab and adapted when actuated to oscillate the control shaft 59, retaining means for releasably holding the shaft 59 in actuated position, and tripping means operable automatically at the completion of the subsequent coupling stroke of the carriage 25 to release the shaft.

The retaining means above referred to is associated with a link 77 which is connected at 78 to the forward end of the brake rod 74 and at 79 to a crank arm 80 depending from the shaft 59. The link is disposed in horizontal position and extends through a guide opening 81 (Fig. 2) in the vertical web of the cross channel of the trailer frame which is located behind the control shaft 59. The left side edge of this side opening is defined by a hardened metal block 82 (Fig. 3) which constitutes a stationary retaining abutment adapted to engage a shoulder 83 on the link 77 when the link is pulled forwardly into brake setting position. The mounting of the link 77 is such as to allow for a slight lateral movement thereof into and out of engagement with the abutment 82 as well as for longitudinal movement to set and release the brakes. Thus it will be seen that when the control shaft 59 is oscillated to swing the crank arm 80 forwardly as shown in Figs. 3 and 4, the link connection will be straightened out and the link will move into engagement with the retaining abutment, the brakes being thereby held set and the locking pins 54 raised. Under these conditions the coupling carriage may be moved forwardly by the tractor.

The tripping means for permitting release of the brakes and automatic locking of the carriage in coupled position at the completion of its coupling stroke comprises a hook member 84 actuated by the carriage as it approaches its rearward limit of travel and operating to move the link 77 laterally, thereby moving the shoulder 83 out of engagement with the abutment 82. Thereafter, the tension on the brakes draws the link through the opening 81, the brakes being thereby released and the pins 54 projected downwardly. The hook member is loosely pivoted at 85 (Fig. 3) on the rearwardly projecting arm of a bell crank 86 pivoted at 87 on a plate secured to the cross piece 41 and the hooked end of the member 84 is pressed downwardly against the upper surface of the link 77 by a tension spring 88 acting on a lug 89 on the member. Since the spring 88 acts eccentrically of the member 84, the free end of the latter is normally swung rearwardly into the position shown in Fig. 3, with the rear vertical edge of a lug 90 on the under side of the member engaging the front vertical edge of an upstanding shoulder 91 on the link 77. The other bell crank arm projects transversely of the trailer with its free end disposed in the path of an adjustable collar 92 on the left hand connecting rod 69 so as to be struck by the collar and carried rearwardly as the carriage approaches its rearmost position during the coupling operation. In such actuation of the bell crank, the hook member 84 is moved to the right from the position shown in Fig. 3 during which movement a lug 93 on the under side of the hook member engages the lug 91 on the link and carries the shoulder 83 out of engagement with the block. Thus the link is tripped and permitted to move rearwardly through the opening 81 to release the brakes and lower the locking pins.

In the movement of the hook member 84 to the right and before the link 77 has been tripped, the lug 90 on the member 84 is carried laterally into a position behind an upstanding lug 94 on the link 77. Thereafter when the link is tripped and moved rearwardly, the rear inclined surface of the lug 94 engages the front inclined surface of the lug 90, thereby raising the hook member and passing behind the lug 90. Said swivelling of the member 84 is permitted by reason of the play allowed at the pivot point 85.

When the link 77 is pulled forwardly to condition the trailer brakes and coupling lock for uncoupling, the front vertical surface of the lug 94 engages the rear vertical surface of the lug 90 and carries the free end of the hook member forwardly as shown in Fig. 4, thereby preventing engagement between the lugs 91 and 93, so that the link can spring into engagement with the abutment 82 even though the bell crank 86 is held in tripping position by the carriage. Thereafter, as the carriage is moved forwardly during uncoupling the bell-crank 86 is allowed to oscillate under the action of the spring 88 in a direction to move the hook member 84 to the left. This movement of the member carries the end of the lug 90 beyond the lug 94 after which the spring 88 swings the member rearwardly to bring the lugs 91 and 93 into tripping relation, as is shown in Fig. 3. Thus, the tripping means is completely conditioned for automatic operation by the forward movement of the carriage in uncoupling.

The mechanism by which the control shaft 59 may be oscillated into brake setting position by the actuation of the hand lever 76 or other control device located in the tractor cab 10 is of the general character shown in my copending application Serial No. 112,781 filed June 1, 1926. In that application the mechanism is shown as a means for applying the trailer brakes by hand to arrest the motion of the tractor and trailer during their combined operation. Referring to Figs. 2 and 6, this mechanism comprises generally two interchangeable hook members both concealed between the forward end of the trailer and the rear end of the tractor and connected respectively to the crank 80 for operating the shaft 59 on the trailer and to the hand lever 76 in the tractor cab. These members are normally disengaged but are arranged to form a link connection between the hand lever and the control shaft upon the initial movement of the hand lever while further movement of the hand lever actuates the link connection in a direction to oscillate the shaft into brake-setting position.

One of the hook members above mentioned comprises a floating rod 95 extending centrally of the trailer and arranged to be raised and lowered into and out of a fixed position above the tractor by movement of the carriage on the trailer during coupling and uncoupling. The rear end of the rod is pivoted at 96 on the lowermost end of the crank 80 which, it will be remembered, is rigid with the control shaft 59 and located at the center thereof. When the trailer is detached from the tractor, the rod 95 is drawn upwardly against the cross piece 41 as shown in Fig. 5 by a tension spring 97 anchored by a projection 98 on the crank 80. As the carriage is moved rearwardly in the coupling operation, an inclined projection 99 at the rear of the carriage engages the forward end of the rod 95 and depresses it into the position shown in Fig. 2. When thus positioned the forward end of the rod is held against lateral movement by guide ribs 100 on the projection 99. Depending from the forward end of the rod 95 is a lug 101 which has a rearwardly inclined surface constituting a hook for engaging the hook member on the tractor, the latter being indicated by the numeral 102.

As shown in Figs. 2 and 6, the member 102 is pivotally supported on a slide 103 which rests upon the upper flat surface 28 of the casting 27 which casting serves as a support for the tractor king pin. The slide is U-shaped in form with its legs extending rearwardly on opposite sides of the king pin 24 and provided with depending side flanges 104 which are guided by the longitudinal side edges of the casting 27. Thus the slide is mounted for movement back and forth along the longitudinal center line of the tractor.

As a means for actuating the slide 103, a rod 105 (Fig. 6) is threaded into a lug formed near the center of the slide. This rod is attached to a lever 106 pivoted at 107 on the fifth-wheel casting 13 and connected at its free end to the hand lever 76 through the medium of a rod 108. A compression spring 109 acting between a shoulder on the rod 105 and a depending portion of the fifth-wheel casting serves to hold the slide in its rearmost position and the lever 76 forwardly.

In the present instance, the hook member 102 is also U-shaped in form having forwardly extending legs which are bifurcated and pivoted at 110 (see Fig. 4) on the side flanges 104 on the slide. An upstanding curved shoulder 111 of substantial length is formed at the center of the member 102 and has a forwardly inclined surface forming a hook which is adapted to engage with the lug 101 on the rod 95 when the member 102 is swung upwardly. Normally, the member 102 rests in horizontal position as shown in Fig. 2 with its legs resting upon the upper surface of the casting 27.

Rigid with each bifurcated end of the member 102 is a depending arm 112 which is pivotally connected to the bifurcated end of a rod 113 extending forwardly of the tractor through an opening in a depending lug 114 on the fifth-wheel casting 13. A compression spring 115 is mounted on this rod between an adjustable shoulder 116 and the lug 114. Normally, that is, when the slide is in its rearward position, the force applied to the arms 112 by the springs 115 is not sufficient to cause the member 102 to be swung upwardly. However, when the slide is moved forwardly by pulling on the hand lever 76, the springs 115 will be compressed, thereby increasing the forces which act on the arms 112.

The adjustment of the springs 115 is such that in the initial forward movement of the slide they will exert sufficient force to swing the member 102 upwardly into engagement with the hooked end of the member 95. In this way a link connection is established between the hand lever 76 and the shaft 59, and further movement of the hand lever will oscillate the shaft in a direction to set the brakes and raise the pins 54. During this movement, the springs 115 are further compressed and serve to hold the hook members firmly engaged. When the lever 76 is released by the driver of the tractor, the slide 103 and the lever move back to normal position which decreases the force applied by the springs 115 so as to allow the hook member 102 to swing back into normal position.

The hook member 102 has a downwardly extending surface 116 at its rear end which is adapted to be engaged and depressed by a depending lug 117 on the carriage in the event that the hook member is for some reason or other held in raised position as the tractor moves rearwardly in coupling to the trailer.

Operation

The operations of coupling and uncoupling the tractor and trailer will now be briefly described assuming that the trailer is detached from the tractor and the parts thereof are positioned as shown in Fig. 3. In this position, the trailer brakes are held set and the locking pins raised by reason of the engagement between the link 77 and the block 82, and the tripping hook 84 is conditioned for operation. To couple the tractor and trailer together, it is merely necessary to back the tractor under the trailer. In such movement of the tractor, the wheels 19 roll up the tracks 15 and bring the fifth-wheel member 45 onto the tractor fifth-wheel member. Then king pin enters the coupling socket and closes the jaws together about itself. Further rearward movement of the tractor pushes the carriage rearwardly and in this movement the floating rod 95 is engaged by the carriage and pressed downwardly from the position indicated in Fig. 5 to the position shown in Fig. 2. As the carriage approaches its rearward limit of travel, the collar 92 engages and actuates the bell crank 86 which moves the hook 84 to trip the link 77. The link moves rearwardly to release the brakes and to oscillate the shaft 59 from the position shown in Fig. 5 to the position shown in Fig. 2. This permits the locking pins 54 to be lowered through the alined openings in the bracket ribs 56 and the tail pieces 55. The trailer and tractor are then completely coupled together so that the trailer may be drawn about by the tractor.

To uncouple the tractor from the trailer, the driver in the cab first pulls the hand lever 76 rearwardly, releases the lever and then drives forwardly with the tractor. Rearward movement of the lever 76 pulls the slide member 103 forwardly. In the initial part of this movement, the springs 115 are compressed and the increased force exerted thereby on the arms 112 of the member 102 causes the member to be swung upwardly into engagement with the hook end of the rod 95, an operative connection being thereby established between the hand lever and the control shaft 59. Further movement of the slide pulls the rod 95 and the crank 80 forwardly into the position shown in Fig. 4. Such oscillation of the shaft 59 causes the brakes to be set and the locking pins to be raised. The shaft 59 is held in this position by the link 77 which engages in front of the retaining abutments 82. When the driver releases the hand lever 76 the lever and the slide 103 move back into normal position due to the action of the spring 109, the hook 102 also being moved rearwardly and allowed to fall down into inactive position. In this position the shoulder 111 is disposed below the level of the hook on the rod 95 so as to pass under the hook end of the rod when the tractor moves forwardly. Forward movement of the carriage in coupling allows the rod 95 to swing upwardly into an out of the way position as shown in Fig. 5.

From the foregoing it will be apparent that I have provided a simple and effective arrangement whereby the tractor can be detached from or connected to the semi-trailer without requiring the driver of the tractor to leave the tractor cab.

I claim as my invention:

1. A combined vehicle of the character described comprising, in combination, a tractor, a trailer, coupling mechanism by which the tractor and trailer may be connected together, an element on the trailer movable between locking and unlocking positions to lock and unlock said coupling mechanism, an actuating rod connected to said element and having a hooked end positioned beneath the forward end of the trailer, a complemental hooked member mounted on the tractor for movement upwardly into engagement with said rod and for movement longitudinally of the tractor to actuate said rod and move said element into unlocking position, a hand operable control device on the tractor for actuating said hooked member, and means on the trailer for retaining said element in unlocking position after said device has been returned to inactive position.

2. A combined vehicle of the character described comprising, in combination, a tractor, a trailer, coupling mechanism by which the tractor and trailer may be connected together, a locking element for said coupling mechanism mounted on the trailer, a control device on the tractor adapted to be operated by hand, and means providing a connection between said element and said device for moving said element into unlocking position upon the actuation of said device, said connecting means including two normally disengaged hooked members, one mounted on the trailer and connected to said element and the other mounted on the tractor and connected to said device, and means operating in the initial movement of said device for causing interengagement of said members.

3. A combined vehicle of the character described comprising, in combination, a tractor, a trailer, coupling mechanism by which the tractor and trailer may be connected together, a locking element for said coupling mechanism, a trailer brake, a common actuating means adapted when moved into active position to set said brake and move said element into unlocking position, means on the trailer for retaining said actuating means in inactive position, mechanism on the tractor for moving said member into active position including a control device adapted for hand operation, two interengageable members normally held in disengaged relation one being connected to said actuating means and the other to said device, and means operating in the initial movement of said device to cause engagement between said members.

4. A combined vehicle of the character described comprising, in combination, a tractor, a trailer, coupling mechanism including a head mounted to move back and forth on the trailer as the tractor moves rearwardly and forwardly during coupling and uncoupling, a trailer brake, a member operable to lock said head in coupled position, a single actuating element on the trailer operatively associated with said brake and said member and adapted when actuated to set said brake and move said member into unlocking position, means operable by hand from the tractor to actuate said element, retaining means adapted for engagement with said element after actuation of the latter by said hand operable means whereby to hold the brake and member in position to permit uncoupling irrespective of the position of said hand operable means, and a tripping device operated automatically by rearward movement of said head during coupling to disengage said element and said retaining means.

5. A combined vehicle of the character described comprising, in combination, a tractor, a trailer, coupling mechanism including an element on the trailer adapted to be coupled on the tractor and moved back and forth thereon as the tractor moves longitudinally of the trailer in coupling and uncoupling, a brake for maintaining the position of the trailer during coupling and uncoupling, means operable to lock said element in its coupled position so that the tractive force of the tractor may be applied to the trailer through the medium of said element, a single actuating means located on the tractor and operable by hand to apply said brake and release said locking means, and means on the trailer operable to hold said brake and locking means in actuated position to permit of forward movement of said head during uncoupling of the tractor and trailer.

6. A combined vehicle of the character described comprising, in combination, a tractor and a trailer adapted to be connected together, a trailer brake and a coupling lock arranged for conjoint operation, a hand operable control device on the tractor for conditioning said brake, a coupling lock for uncoupling of the tractor and trailer, and mechanism for releasably retaining said brake and lock in actuated position whereby to permit uncoupling of the tractor and trailer by movement of the tractor forwardly and permit of automatic operation of said brake and lock in the succeeding coupling operation, said retaining mechanism being rendered operative while the tractor and trailer are in coupled relation whereby to permit the return of said device to normal position prior to the forward movement of the tractor.

7. A combined vehicle of the character described comprising, in combination, a tractor, a trailer, coupling mechanism including an element adapted to be moved back and forth on the trailer during coupling and uncoupling, a trailer brake, a hand operable control device on the tractor by which the brake may be set to permit uncoupling, retaining means rendered operative upon the actuation of said device and operable to hold said brakes set to permit said element to be moved forwardly by the tractor, and means operating automatically at the completion of the succeeding coupling stroke of said element to render said retaining means ineffectual.

8. A combined vehicle of the character described comprising, in combination, a tractor and a trailer adapted to be connected together, a trailer brake, a control device mounted on the tractor and adapted to be actuated by hand to directly set said brake, retaining means on the trailer for releasably holding said brake set to permit uncoupling, said means being rendered operative automatically upon the setting of the brake by actuation of said device and prior to the uncoupling movement of the tractor, and means operating automatically during the subsequent coupling operation to render said retaining means ineffectual thereby releasing the brakes.

9. A combined vehicle of the character described comprising, in combination, a tractor and a trailer adapted to be connected together, a trailer brake for maintaining the position of the trailer during coupling and uncoupling of the tractor and trailer, a control device mounted on the tractor and normally maintained in inactive position, said device being adapted to be moved to active position by hand prior to uncoupling of the tractor and trailer whereby to set said brake, retaining means on the trailer operable to hold said brake set so as to permit return of said control device to inactive position prior to any uncoupling movement of the tractor relative to the trailer.

10. A combined vehicle of the character described comprising, in combination, a tractor, a trailer, coupling mechanism including an element mounted to move back and forth on the trailer during coupling and uncoupling, a member by which said element may be locked in coupled position, a control device on the tractor operable by hand to move said member into unlocking position, retaining means operable independently of said device for holding said member in unlocking position after actuation by said device to permit uncoupling by forward movement of said element, and means actuated by said element during a subsequent coupling movement to permit said member to move into locking position whereby to automatically lock the tractor and trailer in coupled relation.

11. A combined vehicle of the character described comprising, in combination, a tractor, a trailer, coupling mechanism including a carriage mounted to move back and forth on the trailer during coupling and uncoupling of the tractor and trailer, a locking member operable to hold said carriage in its rearward position, a control device mounted on the tractor and normally maintained in inactive position, said device being associated with said locking member when the tractor and trailer are coupled together and adapted to be actuated by hand prior to uncoupling to move said member into unlocking position, retaining means on the trailer operable to hold said member in unlocking position after said device has been moved back to inactive position, and tripping means actuated automatically during the subsequent coupling stroke of said carriage to permit said member to move into locking position.

12. A combined vehicle of the character described comprising, in combination, a tractor, a trailer, coupling mechanism by which the tractor and trailer may be connected together, a lock for said coupling mechanism, a control device on the tractor adapted to be operated by hand to move said lock into unlocking position, means operable before any relative movement between the tractor and trailer takes place to releasably retain said lock in unlocking position independently of the position of said control device after actuation by the latter whereby to permit uncoupling of the tractor and trailer, and means actuated automatically during the succeeding coupling operation to render said retaining means inoperative whereby to permit automatic locking of said coupling mechanism.

13. A combined vehicle of the character described comprising, in combination, a tractor, a trailer, coupling mechanism including an element on the trailer adapted to be coupled on the tractor and moved back and forth thereon as the tractor moves longitudinally of the trailer in coupling and uncoupling, a brake for maintaining the position of the trailer during coupling and uncoupling, means operable to lock said element in its coupled position so that the tractive force of the tractor may be applied to the trailer through the medium of said element, means on the tractor operable to apply said brakes and to release said locking means, and means on the trailer operable to hold said brake in applied position, whereby the brakes are held applied during tractor-trailer separation.

In testimony whereof, I have hereunto affixed my signature.

ADDI BENJAMIN CADMAN.